(12) United States Patent  
Becher et al.

(10) Patent No.: US 7,502,367 B2  
(45) Date of Patent: Mar. 10, 2009

(54) METHOD FOR PROVIDING A PROGRAM MODULE IN A COMMUNICATIONS SYSTEM

(75) Inventors: Reinhard Becher, München (DE); Markus Dillinger, München (DE)

(73) Assignee: Siemens Aktiengesellschaft, Munich (DE)

( * ) Notice: Subject to any disclaimer, the term of this patent is extended or adjusted under 35 U.S.C. 154(b) by 854 days.

(21) Appl. No.: 10/333,400

(22) PCT Filed: Jul. 19, 2001

(86) PCT No.: PCT/DE01/02735

§ 371 (c)(1),
(2), (4) Date: May 30, 2003

(87) PCT Pub. No.: WO02/07406

PCT Pub. Date: Jan. 24, 2002

(65) Prior Publication Data

US 2004/0103142 A1    May 27, 2004

(30) Foreign Application Priority Data

Jul. 19, 2000    (DE)    ................. 100 35 171

(51) Int. Cl.
*H04L 12/28*    (2006.01)
(52) U.S. Cl. .................... 370/389; 709/201
(58) Field of Classification Search ............. 709/208, 709/238, 232, 217, 211; 713/150, 152, 155; 380/247, 278; 370/389

See application file for complete search history.

(56) References Cited

U.S. PATENT DOCUMENTS

| 5,485,519 | A | * | 1/1996 | Weiss ................... 713/185 |
| 5,708,709 | A | * | 1/1998 | Rose ..................... 705/59 |
| 5,768,539 | A | * | 6/1998 | Metz et al. .............. 709/249 |
| 5,940,591 | A | * | 8/1999 | Boyle et al. ............. 726/3 |
| 5,987,123 | A | * | 11/1999 | Scott et al. ............. 713/165 |
| 6,067,582 | A | * | 5/2000 | Smith et al. ............ 710/5 |
| 6,088,451 | A | * | 7/2000 | He et al. ................ 726/8 |
| 6,088,730 | A | * | 7/2000 | Kato et al. ............. 709/227 |
| 6,212,636 | B1 | * | 4/2001 | Boyle et al. ............ 713/168 |
| 6,353,599 | B1 | * | 3/2002 | Bi et al. ................. 370/328 |
| 6,587,684 | B1 | * | 7/2003 | Hsu et al. .............. 455/419 |
| 6,724,372 | B1 | * | 4/2004 | Bi et al. ................. 345/179 |
| 6,924,790 | B1 | * | 8/2005 | Bi ........................ 345/179 |
| 7,370,071 | B2 | * | 5/2008 | Greschler et al. ....... 709/201 |
| 2001/0047377 | A1 | * | 11/2001 | Sincaglia et al. ........ 709/1 |
| 2002/0012329 | A1 | * | 1/2002 | Atkinson et al. ........ 370/330 |
| 2003/0133423 | A1 | * | 7/2003 | LaDue ................... 370/330 |

FOREIGN PATENT DOCUMENTS

| EP | 0 778 512 A2 | 6/1997 |
| EP | 0 813 132 A2 | 12/1997 |

* cited by examiner

*Primary Examiner*—Hassan Kizou
*Assistant Examiner*—Mounir Moutaouakil
(74) *Attorney, Agent, or Firm*—Staas & Halsey LLP

(57) ABSTRACT

A method provides a program module in a communications system. The program module is accommodated by a server, the program module is transmitted to a subscriber terminal, a test criterion is calculated each time inside a security device and in the subscriber terminal by using the program module and an individual key. By comparing the test criterion, it is determined whether the program module has been defectively received by the subscriber terminal.

21 Claims, 5 Drawing Sheets

METHOD FOR PROVIDING A PROGRAM MODULE IN A COMMUNICATIONS SYSTEM

CROSS REFERENCE TO RELATED APPLICATIONS

This application is based on and hereby claims priority to PCT Application No. PCT/DE01/02735 filed on 19 Jul. 2001 and German Patent No. 100 35 171.9 filed on 19 Jul. 2000, the contents of which are hereby incorporated by reference.

BACKGROUND OF THE INVENTION

The invention relates to a method for providing a program module in a communications system, in particular in a radio communications system.

In present-day computer networks, a client/server structure is frequently used in order to provide new software, which is generally also referred to as a software upgrade. This client/server structure is distinguished by a hierarchical structure, with the software being stored in a relatively high-level server computer which provides the required software to client servers, which are connected to the server, when requested by these client computers.

Against the background of this basic model, which is also referred to as a single server architecture, there are further modified forms in which, for example, a plurality of servers process the requests from a large number of lower-level clients (multi-server architecture). So-called proxy servers may also be used for temporary storage of the software, and these are arranged between the client and the server in the hierarchy. The software which is requested by a client is temporarily stored in the proxy server in this architecture, so that, when it is requested once again by a different client, the software can be requested directly from the proxy server (which is generally located physically closer). This method is used, by way of example, for temporary storage of web pages that are called up frequently on the Internet.

In radio-based cellular communications networks such as the already existing GSM network (Global System Mobile), the planned UMTS network (Universal Mobile Telecommunications System) has a third generation mobile radio network or the Hiperlan/2 system as a future wireless LAN system, it is also necessary to carry out software upgrades, for example an upgrade to a WAP (Wireless Application Protocol) browser.

In this case, the software may be provided either by the manufacturer of a subscriber station, by a network operator, or else by an independent service provider.

In these methods, the connection between the server and a client is scrambled in order to distribute contents and software and/or program modules in a secure manner. Symmetric or asymmetric methods, such as PGP (Pretty Good Privacy) or SSL (Secure Socket Layer) are used in this case according to the related art. However, these methods have the disadvantage that they cannot prevent the contents and/or the software being modified by network components via which this information is transmitted to the subscriber terminal.

EP 0813132 A2 describes a method for distributing a program code, in which a trustworthy third party creates a certificate for the program code, which is distributed together with the program code. A receiving system can confirm the integrity of the certificate, and hence also the integrity of the program code, by checking this certificate.

SUMMARY OF THE INVENTION

One potential object of the invention is thus to create a method for providing program modules in a communications system, which allows secure reception of the program modules by a subscriber station.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
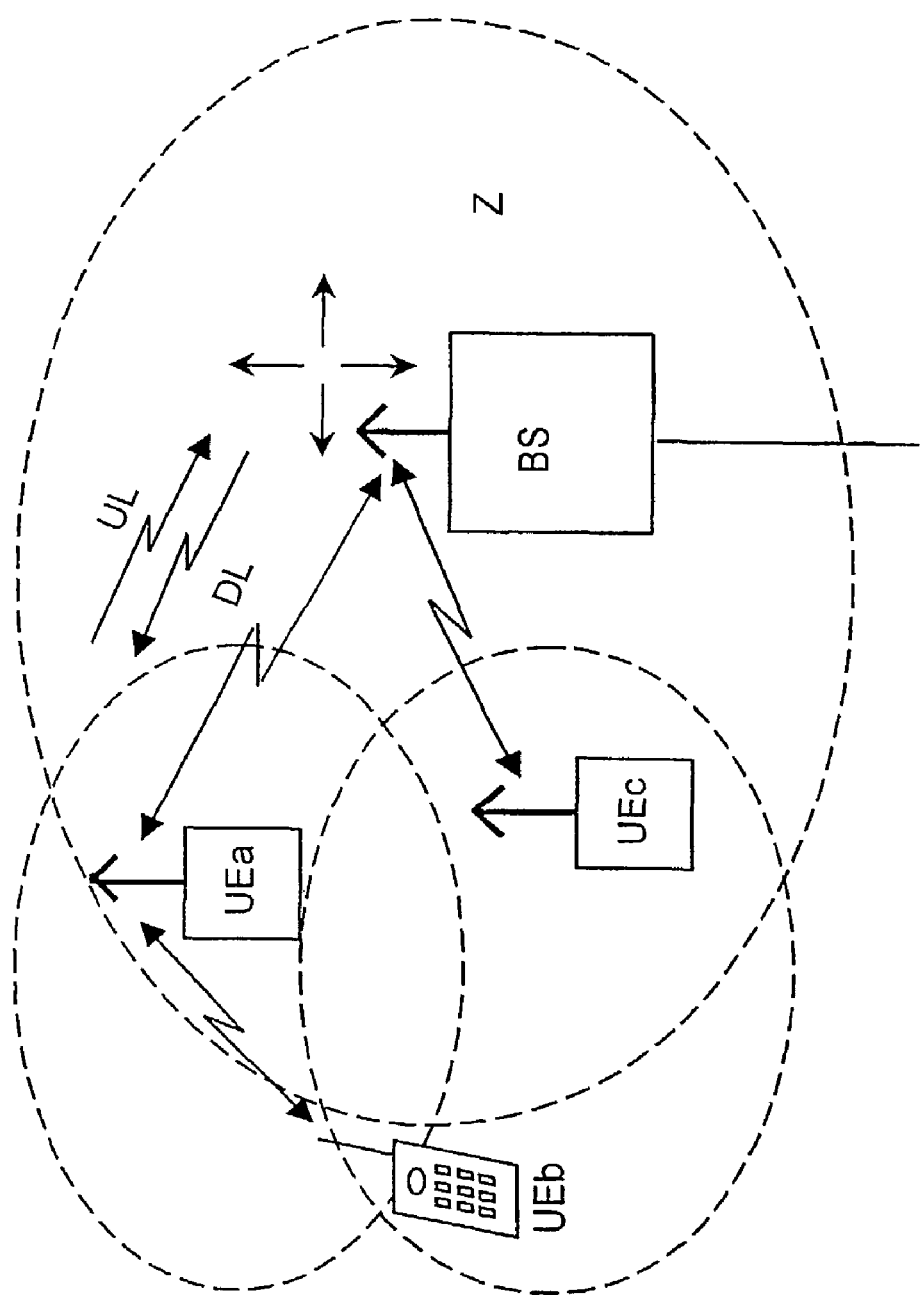
FIG. 1 shows a block diagram of a communications system, in particular of a radio communications system.

Reference will now be made in detail to the preferred embodiments of the present invention, examples of which are illustrated in the accompanying drawings, wherein like reference numerals refer to like elements throughout.

FIG. 1 shows a detail of a radio communications system as an example of a communications system in which the invention can possibly be used. The illustration shows the structure of a HIPERLAN/2 system. A system such as this has a plurality of base stations BS which are connected to an IP-based backbone. These base stations BS are used for assigning radio resources to subscriber terminals UE (user equipment) for routing and transmission of incoming and outgoing data packets (PDU Packet Data Unit) via a radio interface. The subscriber terminals UE are in this case, for example, in the form of mobile stations or other types of mobile and stationary terminals. Each base station BS supplies radio resources to at least one radio cell Z.

As is illustrated by way of example in FIG. 1, the subscriber terminal UEb is located outside the radio cell Z of the base station BS. In this case, according to the related art, it would be impossible for this base station BS to supply radio resources to this subscriber terminal UEb. However, signals can be transmitted in the uplink direction UL and the downlink direction DL by using a subscriber terminal UEa, which is located in the supply area of the base station BS, as a relay station to form a so-called multihop system. In this case, the relay station UEa passes on the signals received in the respective transmission direction, for example using the same carrier frequency as the base station BS. As is illustrated by way of example, each relay station UEa, UEc in turn forms a small radio cell, thus enlarging the effective extent of the radio cell Z of the base station BS.

As has already been described in the introduction, a client/server structure is frequently used in present-day computer networks for providing new software, which is generally also referred to as a software upgrade. This client/server structure is distinguished by a hierarchical structure, with the software being stored in a relatively high-level server computer which provides the required software to client computers, which are connected to the server, when requested by these client computers.

Against the background of this basic model, which is also referred to as a single server architecture, there are further modified forms in which, for example, a plurality of servers process the requests from a large number of lower-level clients (multi-server architecture). So-called proxy servers may also be used for temporary storage of the software, and these are arranged between the client and the server in the hierarchy. The software which is requested by a client is temporarily stored in the proxy server in this architecture, so that, when it is requested once again by a different client, the software can be requested directly from the proxy server (which is generally located physically closer). This method is used, by way of example, for temporary storage of web pages that are called up frequently on the Internet.

In radio-based cellular communications networks such as the already existing GSM network (Global System Mobile) or the planned UMTS network (Universal Mobile Telecommunications System) as a third generation mobile radio network it is also necessary to carry out software upgrades, for example an upgrade to a WAP (Wireless Application Protocol) browser.

In this case, the software may be provided either by the manufacturer of a subscriber station, by a network operator, or else by an independent service provider.

If one of the client/server architectures described in the introduction is used for a software upgrade, with the software in this case being stored centrally on servers in the mobile radio network and being transmitted from there to each individual subscriber station, this results in unacceptable waiting times, however, when there are a large number of subscriber stations.

Furthermore, in mobile communications networks and in contrast to a landline network, it is impossible to associate one subscriber terminal with one access to the network. In consequence, when software is provided centrally by a relatively high-level server (for example by a base station), each subscriber terminal in the communications network must ask the respective server, at regular time intervals, whether there is any new software to download. This produces an additional load.

One possible way to solve this problem is to provide the software upgrade in the form of a "snowball" system. Each subscriber terminal which is registered in a cell and which has stored the software and/or the program module can transmit this to further subscriber terminals which are registered in that cell. Each subscriber terminal is thus not only a client but also a server. Direct transmission of the software from one subscriber terminal to one or more further subscriber terminals allows the software to be disseminated virtually exponentially. In a corresponding way, the time taken to provide the software to all the subscriber terminals which are registered in a cell can be reduced by several times.

Also, and advantageously in comparison to a hierarchical client/server system, resources are saved since, at the start of the process, the software can be transmitted from only one server to one subscriber terminal in the communications system, which can then pass on the software to the other subscriber terminals in the system.

Since the software can be transmitted from one subscriber terminal to a further subscriber terminal on the direct path, and network device carries out any signaling tasks, this also conserves resources.

However, this method has been found to be subject to a problem in that the respective receiver of a program module can modify this program module, for example after unpacking and installation, before transmitting it to a further subscriber terminal. This manipulation capability is illustrated, by way of example, in FIG. 2.

A secure connection is set up between a server and a first subscriber terminal UEa. This may be protected, for example, by a known scrambling program. In a firststep (1), the first subscriber terminal requests a program module SP (software packet) which is transmitted in a second step (2) to the first subscriber terminal UEa. After unpacking and installation of the program module SP, this program module SP can be manipulated by the first subscriber terminal UEa and can be packed once again, step (4). If a further subscriber terminal UEb now requests the program module from the first subscriber terminal UEa in a fifth step (5), then the first subscriber terminal UEa sends the manipulated program module SP* to the further subscriber terminal UEb, step (6). Installation of this manipulated program module SP*, step (7), which now, by way of example, has a virus, can disadvantageously lead to malfunctions in the further subscriber terminal UEb.

This problem can be solved by allocating an individual key PK (private key) to each subscriber terminal UE or to each subscriber, which can be used, for example, to calculate a respective checksum. This key is, for example, stored in a memory device (SIM, UIM) in the subscriber terminal, and is protected against being read without authorization.

In addition to the storage of the key in the subscriber terminal, this key is stored in a security device. This security device may, for example, be implemented in a corresponding manner to a so-called security box SB, a trust center TC or an authentication center AC as a component of the communications system, or independently of it. The security device is advantageously associated with one respective provider, and provides the program modules. The provider may, for example, be a manufacturer (equipment supplier), operator, service provider, application provider or content provider. An individual key for the various providers can be stored in the terminal or in an external memory medium (smart card), which is supplied to the subscriber terminal.

In addition, the address (E.164, URL, . . . ) may also be stored for routing purposes in the security device, in which case the address may also be stored in the communications system, for example together with the subscriber profile.

If, by way of example, a program module (software update) is transmitted in unscrambled form or in scrambled form from a manufacturer (Siemens AG) or the manufacturer's server to the subscriber terminal . After receiving the program module, the subscriber terminal uses an appropriate key (from the manufacturer) in order to calculate a checksum from that key and the program module. This calculcated checksum is transmitted to the manufacturer's or the communications system's security device. In addition, in this case, the subscriber identification may also be transmitted in order to identify the subscriber or the subscriber terminal. This subscriber identification may, in a mobile radio system by way of example, be the IMEI (International Mobile Equipment Identity) or, in some other communications system, a unique symbolic name, for example the e-mail address. In the same way, the address of the provider can also be stored in the subscriber terminal, together with the key.

The security device uses the stored key and the program module which has likewise been received from the server to calculate a checksum in the same way. The respective checksum which is calculated in the security device and that which is calculated in the subscriber terminal are then compared. If the checksums match, then the program module has been received without any corruption by the subscriber terminal and can subsequently be installed in the subscriber terminal, after confirmation by the security device. If, on the other hand, the checksums do not match, then the subscriber station has received a program module with errors, or a corrupted program module. The subscriber terminal then does not install the program module and, possibly, signals to the security device the source or the subscriber terminal from which it received this program module. Because the identity of the source or subscriber terminal is stored in the security device, the user of the security device can then, if required, take suitable steps with regard to the faulty source, such as blocking that subscriber terminal.

The method according offers, inter alia, the following advantages:

possible use of security algorithms as are already nowadays used for subscriber authentication in mobile radio systems, for checking that received program modules have no errors, possible use of terminal-specific information, such as the IMEI, for checking that received program modules have no errors, a known SSL mechanism may be used for passing on program modules, provided that this is desired by the issuing authority, and the SSL mechanism can likewise be used for distribution of the keys for checksum calculation, if the key in the subscriber terminal is intended to be updated from time to time, in order to improve security.

Figure 2:
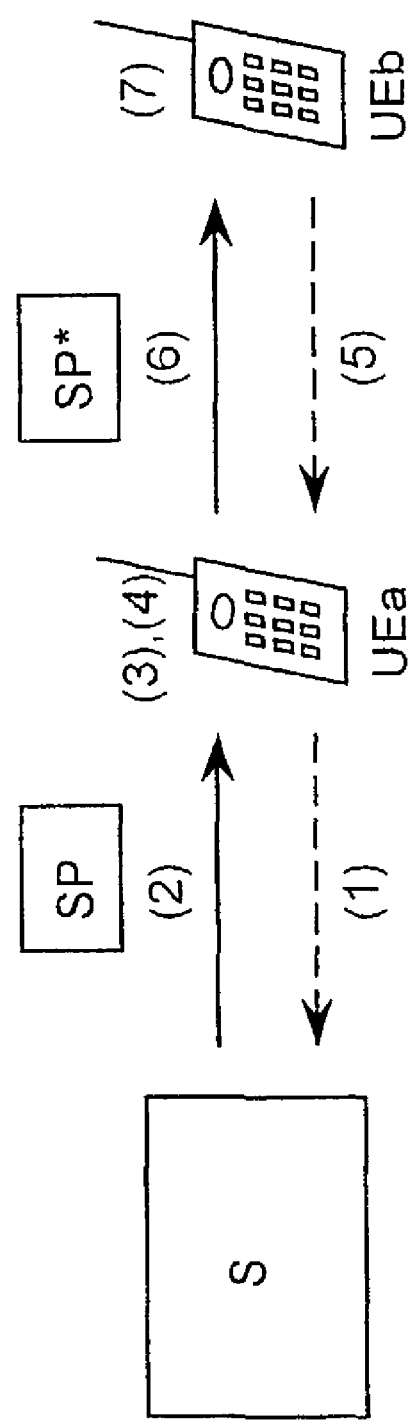
FIG. 2 shows the transmission of a program module from a server to a subscriber terminal and to a further subscriber terminal.
Figure 3:
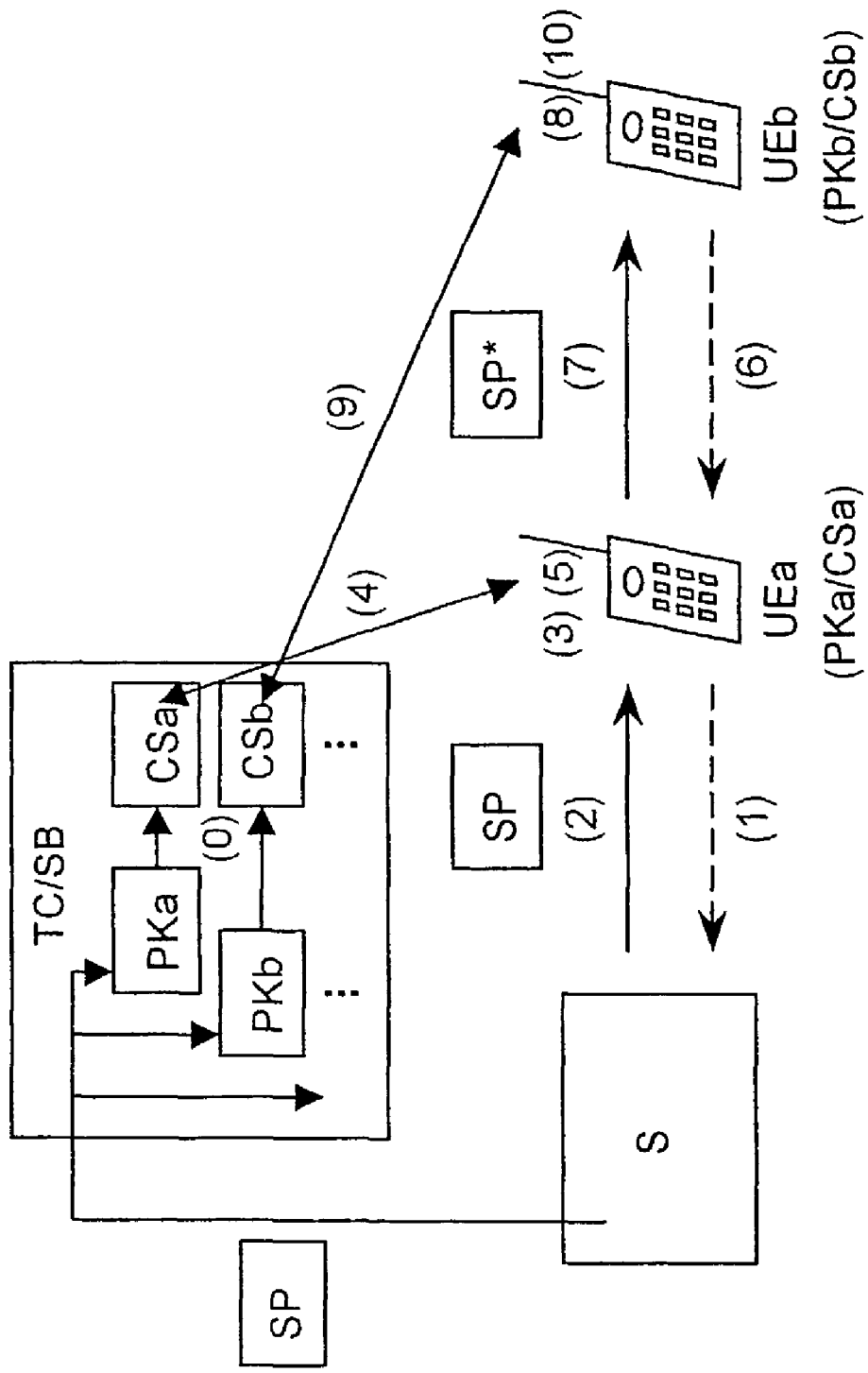
FIG. 3 shows the transmission of a program module, as shown in FIG. 2, with a security check according to one aspect of the invention.

Based on FIG. 2, FIG. 3 shows how a security concept can be implemented in a described environment. In a first step (1), a first subscriber terminal UEa requests a program module SP, which is transmitted in a second step (2) from the server S to the first subscriber terminal UEa. In a third step (3), a first checksum CSa is calculated in the first subscriber terminal UEa based on the program module SP and a first terminal-specific or subscriber-specific key PKa. This calculated checksum CSa is sent to the security device TC/SB, where it is compared with a checksum CSa calculated in the same manner in an initial step (0). In this case, the checksum may be transmitted to the security device in a scrambled form. If the security device TC/SB confirms that the checksums are identical, then it signals this fact to the first subscriber terminal UEa which then installs the program module SP, in a fifth step (5).

If, in a sixth step (6), a second subscriber terminal UEb now requests the program module SP from the first subscriber terminal UEa, and the first subscriber transmits the program module SP* to the second subscriber terminal UEb in a seventh step (7). In a corresponding way to the third step (3), a second checksum CSb is calculated in the second subscriber terminal UEb, in an eighth step (8), based on the program module SP* and a second terminal-specific or subscriber-specific key PKb, and this is then transmitted to the security device TC/SB, step (9), where the checksums CSb are once again compared. Once it has been confirmed that the checksums CSb match, the program module SP* is installed in the second subscriber terminal UEb in a tenth step (10).

Figure 4:
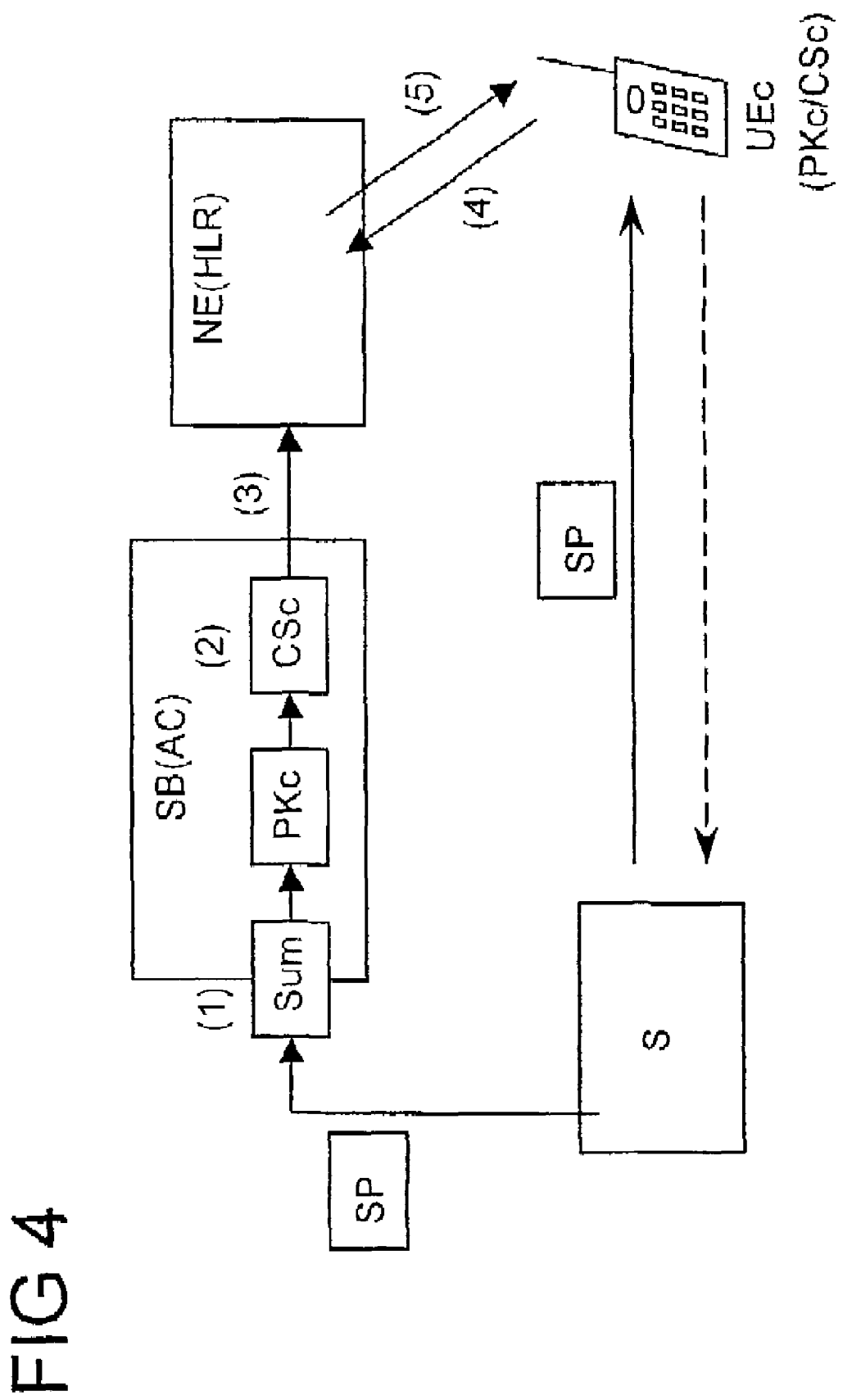
FIG. 4 shows the transmission of a program module from a server to a subscriber terminal with a first security concept option.

FIG. 4 will now be used by way of example to explain how known security components of a mobile radio system can advantageously be used for the method. In a first step (1), a sum Sum is calculated from a program module SP in a device, using a known method. The device may in this case be incorporated in the security device SB, in the case of a mobile radio system, by way of example, in the central authentication center AC, or separately from the security device SB. A compressed program module may also be defined, by way of example, as the sum Sum. In a second step (2), a checksum CSc is calculated by the standardized key PKc (kc), in which case the calculation can be carried out in a corresponding manner to the calculation of RES and SRES in the GSM mobile radio system. The sum Sum and the checksum CSc are then transmitted to a central device NE in the communications system, for example to the HLR (Home Location Register) or to the VLR (Visitor Location Register). In addition to this information, the respective information item or an indicator relating to the program module SP and/or in relation to the subscriber terminal UEc or to the subscriber can be transmitted to the central device NE.

A sum is produced from the program module SP in the same way in the subscriber terminal UEc, and a checksum CSc is calculated by the sum and the key PKc. The checksum CSc is then transmitted in a fourth step (4) to the central device NE, with an indicator for the received program module SP likewise also being transmitted. If the central device NE finds a match between the stored checksum CSc and the checksum CSc transmitted by the subscriber terminal UEc, then the program module SP can be installed in the subscriber terminal UEc, after appropriate confirmation from the central device NE.

Figure 5:
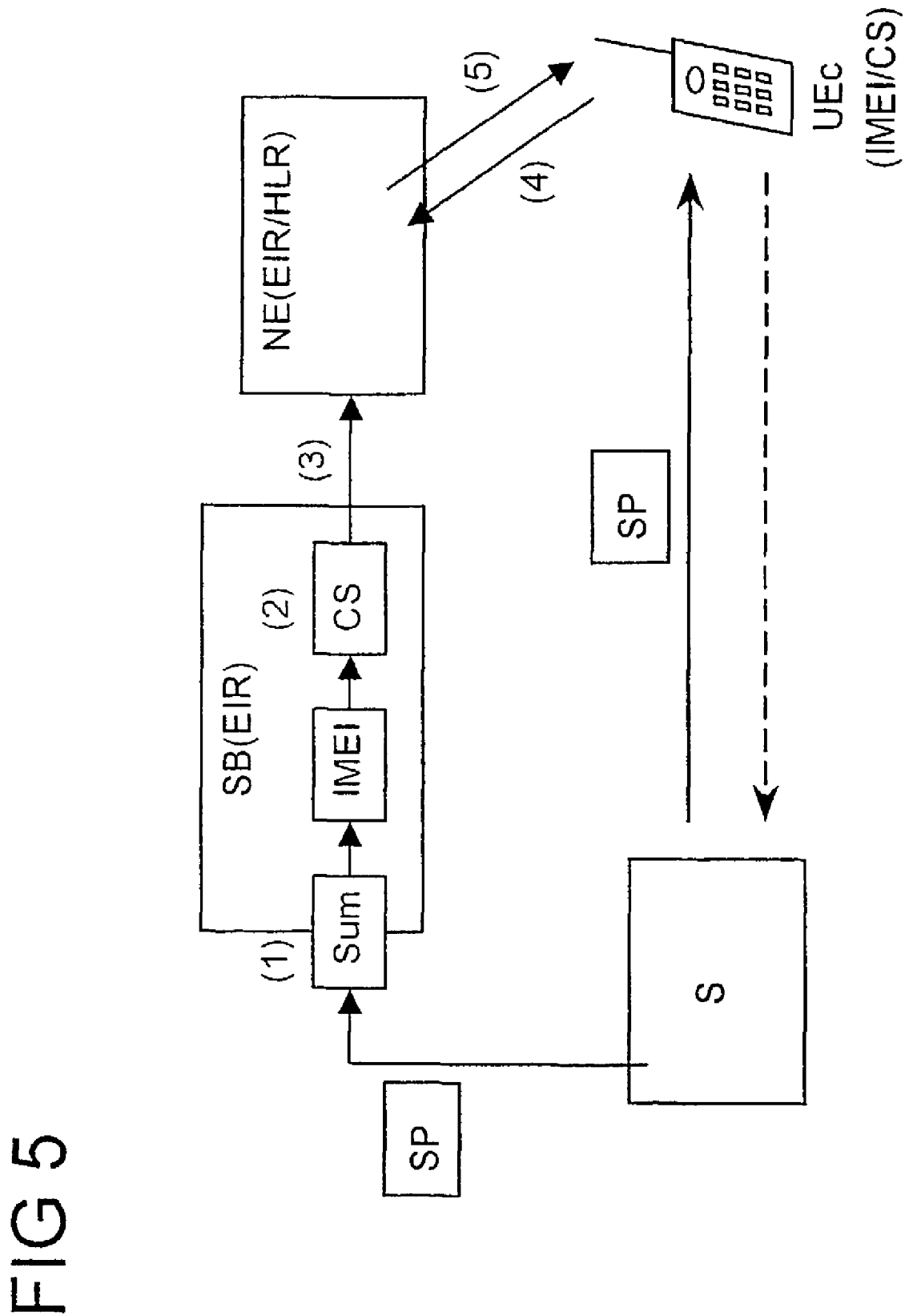
FIG. 5 shows the transmission of a program module from a server to a subscriber terminal as shown in FIG. 4, with a second security concept option.

FIG. 5 shows an implementation of the security concept as an alternative to that shown in FIG. 4. In this case, in contrast, the checksum CS is calculated from the determined sum Sum and from the IMEI (International Mobile Equipment Identity), which is known from the GSM mobile radio system. The IMEI is used to calculate the checksum CS in the same way in the subscriber terminal UEc. In this case, by way of example, the EIR (Equipment Identification Register) may also be used as central device NE for carrying out the comparison of the checksums CS, since the key which is used is terminal-specific.

The invention has been described in detail with particular reference to preferred embodiments thereof and examples, but it will be understood that variations and modifications can be effected within the spirit and scope of the invention.

The invention claimed is:

1. A method for providing a program module in a communications system, comprising:

making the program module available from a server,
   transmitting the program module to a subscriber,
   calculating a checking criterion every time the program module is transmitted, the checking criterion being separately calculated in a security device and at the subscriber, the checking criterion being calculated based on the contents of the program module and based on an individual key associated with the subscriber, and
   comparing the checking criterion calculated in the security device with the checking criterion calculated at the subscriber in order to determine whether errors are contained in the program module received by the subscriber.

2. The method according to claim 1, wherein the subscriber has an associated subscriber terminal, the program module is transmitted from the server to the subscriber terminal, and the key is specific to the subscriber terminal.

3. The method according to claim 1, wherein the program module is transmitted from the server to a subscriber terminal, each subscriber terminal has at least one subscriber associated therewith, and each subscriber of the subscriber terminal has an individual key.

4. The method according to claim 1, wherein the program module is transmitted to a plurality of subscribers, and each subscriber has an individual key.

5. The method as claimed in claim 1, further comprising scrambling the program module prior to transmission to the subscriber.

6. The method as claimed in claim 1, further comprising installing the program module at the subscriber only if it has been received without errors.

7. The method as claimed in claim 1, wherein
the server transmits the program module to a first subscriber, and
the method further comprises:
transmitting the program module from the first subscriber to a second subscriber;
calculating the checking criterion separately in the security device and at the second subscriber, the checking criterion being calculated based a key specific to the second subscriber and based respectively on the program module transmitted to and received by the second subscriber; and
comparing the checking criterion calculated in the security device with the checking criterion calculated at the second subscriber in order to determine whether errors are contained in the program module received by the second subscriber.

8. The method as claimed in claim 1, wherein if the program module has been received with errors, an identifier of the server which sent the program module is stored in the security device.

9. The method as claimed in claim 1, wherein the key is stored in the security device.

10. The method as claimed in claim 1, wherein
the checking criterion calculated by the subscriber is transmitted to a central device in the communications system, and
the checking criteria are compared in the central device.

11. The method as claimed in claim 1, further comprising transmitting a program module identifier together with the checking criterion from the subscriber to a central device.

12. The method as claimed in claim 1, wherein
the communications system is a cellular radio communications system,
the subscriber is a subscriber terminal, and
the subscriber terminal is a stationary or mobile radio station.

13. The method as claimed in claim 5, further comprising installing the program module at the subscriber only if it has been received without errors.

14. The method as claimed in claim 13, wherein
the server transmits the program module to a first subscriber, and
the method further comprises:
transmitting the program module from the first subscriber to a second subscriber;
calculating the checking criterion separately in the security device and at the second subscriber, the checking criterion being calculated based a key specific to the second subscriber and based respectively on the program module transmitted to and received by the second subscriber; and
comparing the checking criterion calculated in the security device with the checking criterion calculated at the second subscriber in order to determine whether errors are contained in the program module received by the second subscriber.

15. The method as claimed in claim 14, wherein if the program module has been received with errors, an identifier of the first subscriber which sent the program module is stored in the security device.

16. The method as claimed in claim 15, wherein the key is stored in the security device.

17. The method as claimed in claim 16, wherein
the checking criteria calculated by the first and second subscribers are transmitted to a central device in the communications system, and
the checking criteria are compared in the central device.

18. The method as claimed in claim 17, further comprising transmitting a program module identifier together with the checking criterion from the subscriber to the central device.

19. The method as claimed in claim 18, wherein
the communications system is a cellular radio communications system,
the subscriber is a subscriber terminal, and the subscriber terminal is a stationary or mobile radio station.

20. A communications system, comprising:
a server to hold a program module;
a transmitter to transmit the program module from the server to a subscriber;
a calculation unit provided at the subscriber to calculate a checksum criterion based on the program module received from the server and based on a key specific to the subscriber;
a security device to calculate a checksum criterion based on the program module transmitted to the subscriber and based on a key specific to the subscriber; and
a central device to compare the checking criteria to determine whether the program module was received with errors.

21. A method for providing a program module in a communications system, comprising:
making the program module available from a server,
transmitting the program module to a subscriber,
calculating a checking criterion every time the program module is transmitted, the checking criterion being separately calculated in a security device and at the subscriber, the checking criterion being calculated based on the contents of the program module and based on an individual key associated with the subscriber, and
comparing the checking criterion calculated in the security device with the checking criterion calculated at the subscriber in order to determine whether errors are contained in the program module received by the subscriber
wherein
the checking criterion is independently calculated in the security device and at the subscriber,
the checking criterion is calculated in the security device and at the subscriber using calculations that are substantially the same, and
the subscriber uses wireless transmission to transmit the checking criterion to a central device where the checking criteria are compared.

* * * * *